No. 723,166. PATENTED MAR. 17, 1903.
J. W. LATIMER.
BUNCHING ATTACHMENT FOR MOWERS.
APPLICATION FILED SEPT. 11, 1901.
NO MODEL. 3 SHEETS—SHEET 1.
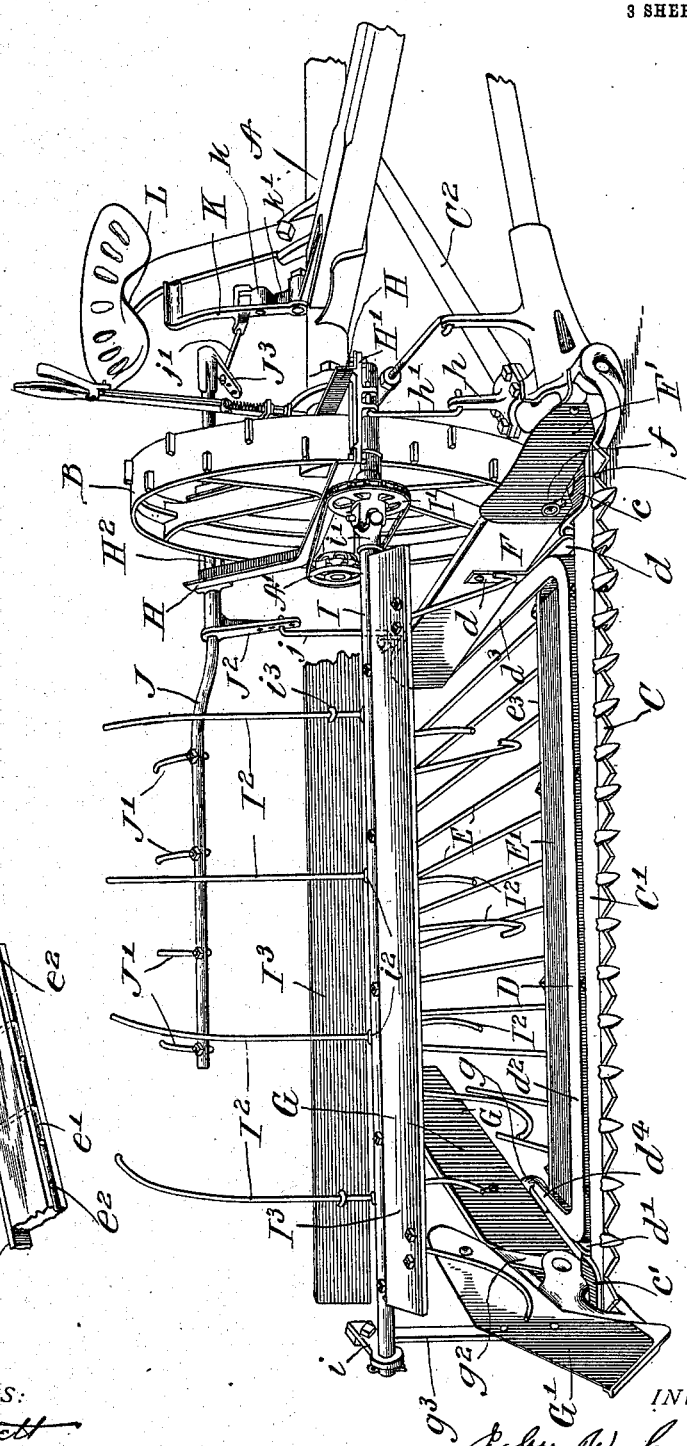
WITNESSES:
Edw. Barrett
Chas. W. Chambers
INVENTOR.
John W. Latimer
BY J. F. Steward
ATTORNEY.

No. 723,166. PATENTED MAR. 17, 1903.
J. W. LATIMER.
BUNCHING ATTACHMENT FOR MOWERS.
APPLICATION FILED SEPT. 11, 1901.
NO MODEL. 3 SHEETS—SHEET 2.
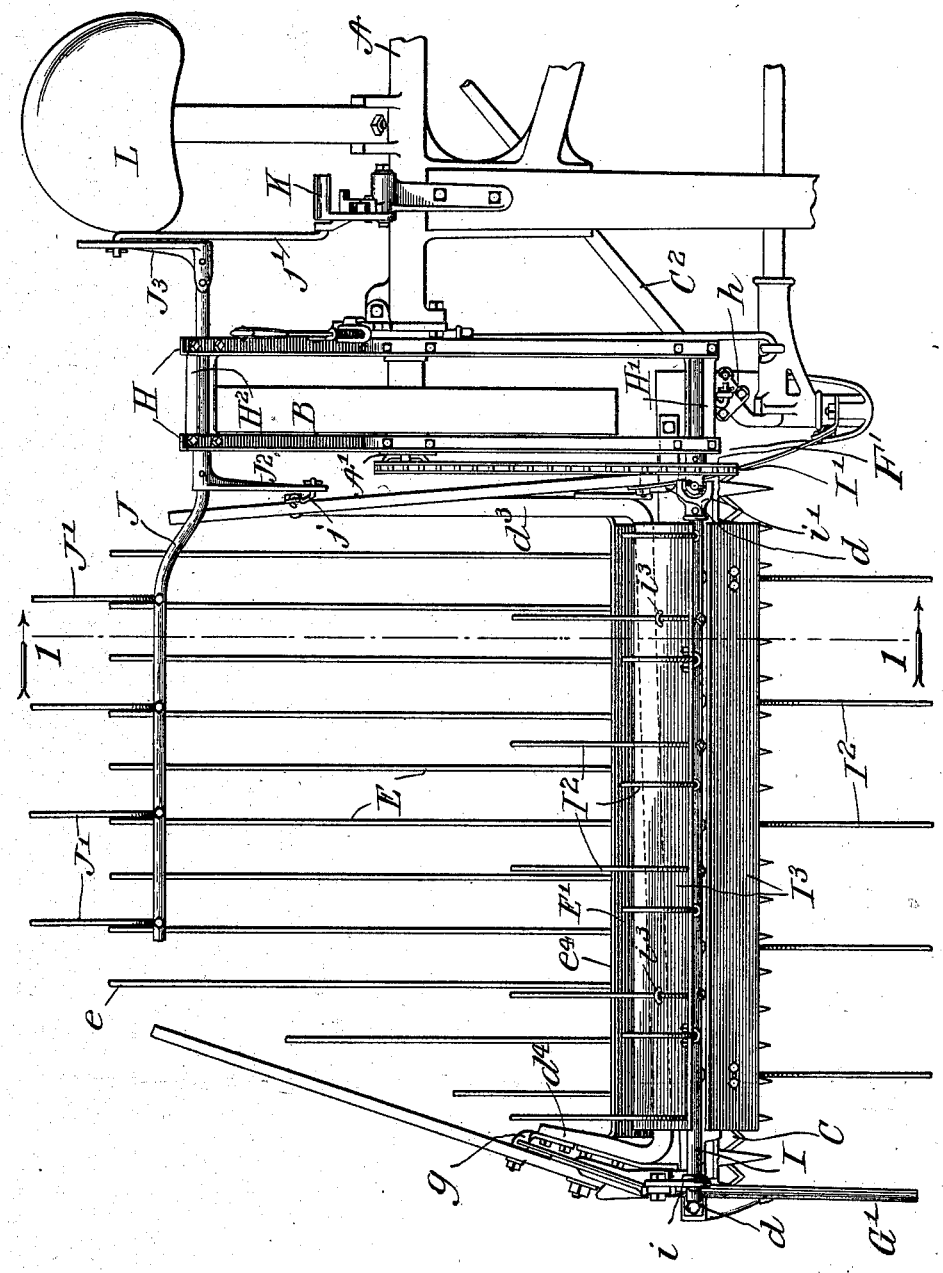
WITNESSES: INVENTOR.

No. 723,166. PATENTED MAR. 17, 1903.
J. W. LATIMER.
BUNCHING ATTACHMENT FOR MOWERS.
APPLICATION FILED SEPT. 11, 1901.
NO MODEL. 3 SHEETS—SHEET 3.
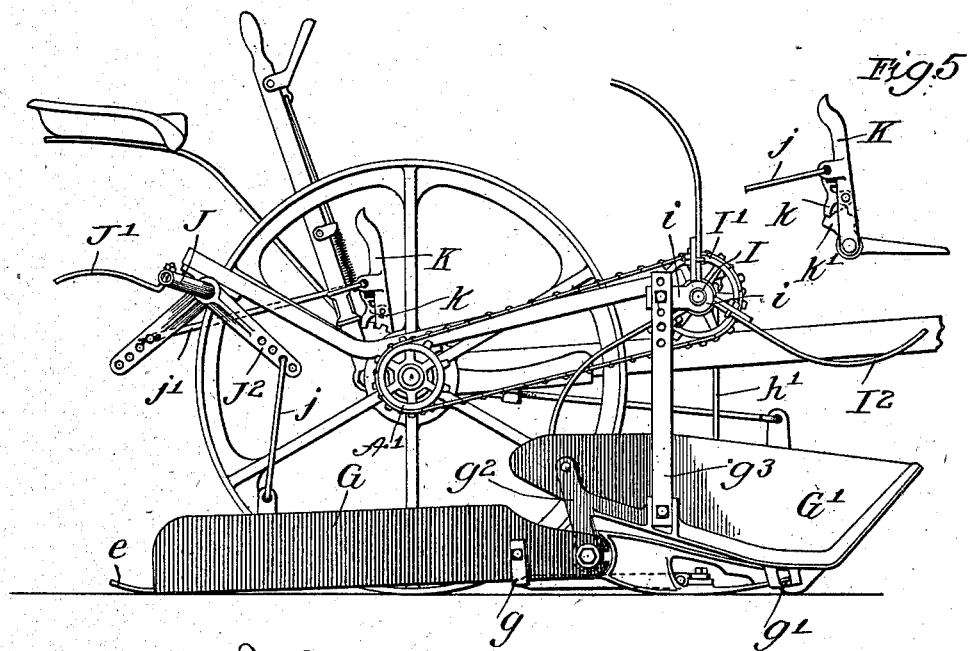
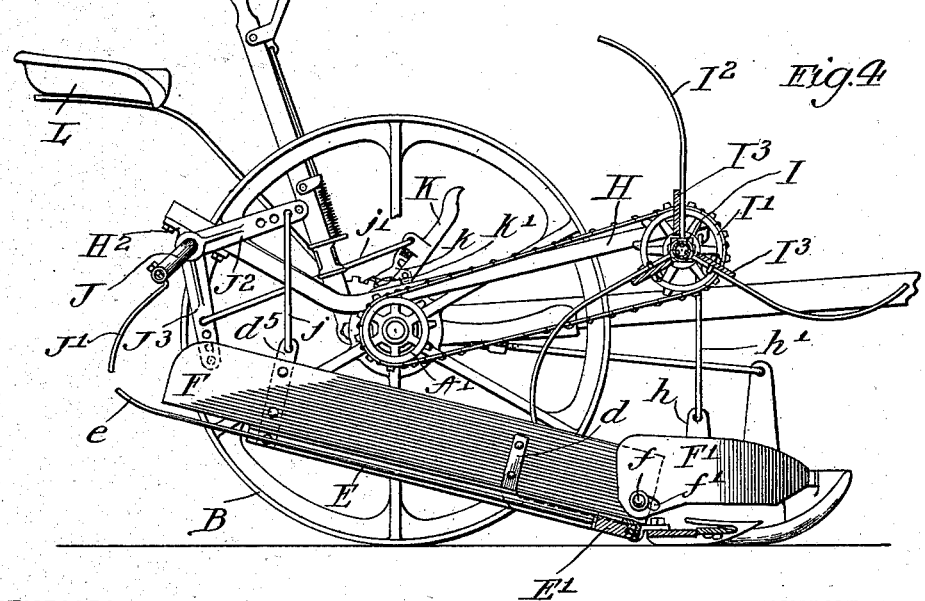
WITNESSES: INVENTOR.
ATTORNEY.

UNITED STATES PATENT OFFICE.

JOHN W. LATIMER, OF CHICAGO, ILLINOIS.

BUNCHING ATTACHMENT FOR MOWERS.

SPECIFICATION forming part of Letters Patent No. 723,166, dated March 17, 1903.

Application filed September 11, 1901. Serial No. 74,994. (No model.)

*To all whom it may concern:*

Be it known that I, JOHN W. LATIMER, a citizen of the United States, residing at Chicago, county of Cook, and State of Illinois, have invented certain new and useful Improvements in Bunching Attachments for Mowers, of which the following is a specification, reference being had to the accompanying drawings, forming a part thereof.

My invention relates to attachments for mowing-machines adapted to receive the cut hay or grass and carry the same until sufficient has been collected to form a bunch, when it is deposited upon the ground. It is desirable at times to bunch the hay or grass immediately after being cut instead of leaving it thinly spread over the field as it falls, to be subsequently raked up. Especially is it so in the case of seed-clover, as much of the seed is saved in this manner.

The object of my invention is to provide effective means which may be readily attached to any mower for accomplishing the above end.

In the drawings, Figure 1 is a perspective view of a portion of a mowing-machine, showing my attachment in position. Fig. 2 is a plan view of the parts shown in Fig. 1. Fig. 3 is a grass side elevation of the same. Fig. 4 is a sectional view on the line 1 1, Fig. 2, looking in the direction indicated by the arrows. Fig. 5 is an elevation in detail of the tripping-lever. Fig. 6 is a perspective view showing the means of securing the gatherer-fingers.

A is the main frame of an ordinary mowing-machine.

B is one of the traction-wheels, and C the cutting apparatus. At either end of the finger-bar C' are secured the strap-eyes $c$ and $c'$ by means of the usual bolts for securing both the inner and outer shoes, respectively. Pivoted in these strap-eyes $c$ and $c'$, by means of the pivot-straps $d$ and $d'$, is the gatherer-frame D, to which they are secured. This gatherer-frame is preferably made of angle-iron and has one transverse member $d^2$ and two longitudinal members $d^3$ and $d^4$, substantially at right angles thereto. (Shown in Figs. 1 and 2.) The gatherer-fingers E, of suitable length, are provided, having at their rear ends the portion $e$, bent upward slightly, and at their front ends a portion $e'$, bent at right angles thereto parallel to the ground. The retainer-board E' is provided with holes $e^2$, adapted to receive the gatherer-fingers E, and also a groove $e^3$ along its front edge, adapted to receive the bent ends $e'$. In order that the gatherer-fingers E may not excessively wear the retainer-board E' where they emerge therefrom, a wearing-plate $e^4$ is provided. The retainer-board E' and the wearing-plate $e^4$ are firmly secured to the transverse member of the gathering-frame D by bolts which pass through them and the vertical member of the angle. The vertical member of the angle thus forms a closure for the groove $e^3$ and holds the gatherer-fingers E rigidly in position. To lend rigidity to the gatherer-frame, the wearing-plate $e^4$ has its ends produced and bent parallel to the longitudinal members of the gatherer-frame and secured thereto.

Secured to the inner longitudinal member $d^3$ of the gatherer-frame by means of an extension of the pivot-strap $d$ and the strap $d^5$ is the board F, which forms one side of the gathering-receptacle. The other side is formed by the usual swather or grass-board G, pivoted to the outer shoe in the usual manner. An inner shield F' is secured at its front end to the inner shoe and at its rear end to the board F by means of the bolt $f$. In order that the gathering-receptacle may move on its pivot, a slot $f'$ on the arc of a circle about the pivot as a center is provided in the shield F', adapted to receive the bolt $f$ and allow it to slide therethrough. The swather or grass-board G is pivoted to the gathering-receptacle by means of the bracket $g$, which is secured to the longitudinal member $d^4$. By means of this bracket $g$ the swather or grass-board is made to move with the gathering-receptacle as it moves on its pivot. A divider G' is adapted to be attached to the outer shoe. A cavity $g'$ is formed in the frame thereof, adapted to receive the point of the shoe, and an arm $g^2$, formed in one part therewith, is secured by the ordinary pivot-bolt of the grass-board, thus holding the divider G' rigidly in position. Firmly secured to said divider is the post or standard $g^3$, adapted to support the outer end of the reel-shaft, as will be later described.

Journaled upon the main axle on either side of the traction-wheel B are the supporting-arms H and H. Their ends are secured together by means of suitable castings H' and H², which serve as ties. To the push-bar C² is secured the clip standard or post $h$, to which is connected the tie H' by means of the link $h'$. The supporting-arms H are moved upon their axis as the cutting apparatus is raised to pass over obstacles by means of the link $h'$ for reasons later to be pointed out. In a suitable box in the tie H' at the front end of the supporting-arms H is journaled the inner end of the reel-rake shaft I, the outer end of which is journaled in a suitable bracket, as $i$, secured to the divider post or standard $g^3$, as above referred to. Secured to the reel-rake shaft I is the sprocket-wheel I', which is adapted to be driven by means of an ordinary sprocket-chain from the sprocket-wheel A', secured to the main axle of the mower. To compensate for the unevenness of the ground which the cutting apparatus must pass over, a universal joint $i'$ is provided in the reel-rake shaft. By this means the reel-rake has the same freedom of movement that the cutting apparatus has.

Secured to the reel-rake shaft I are the reel-rake arms I², the outer ends of which are bent rearward in relation to the direction of their revolution. A preferable form of securement is obtained by providing the arms with a shoulder $i^2$ near the straight or inner ends, which is drawn tight against the reel-rake shaft I, through which the arms pass, by means of a threaded nut. The arms I are staggered—that is, no two revolve in the same plane of revolution, the reason for which will later be shown. To each set of arms is secured a board or beater I³, adapted to be adjusted thereon by means of the yoke-bolts $i^3$. These beaters serve the purpose of preventing the grass from winding upon the reel-shaft.

Pivoted in a suitable box in the tie H² at the rear end of the supporting-arms H is the rocker-shaft J of the receptacle gate or closure. Secured to the shaft J in a similar manner that the reel-arms are secured to the reel-rake shaft are the fingers J'. Immediately above the longitudinal member $d^3$ of the gatherer-frame D is secured the rocker-arm J². This arm is connected to the member $d^3$ of the gatherer-frame D by means of the link $j$ and the strap $d^5$. To the end of the rocker-shaft J nearest the operator's seat L is secured a second rocker-arm J³. In a convenient position upon the frame of the machine is placed a foot-lever K, which is connected to the rocker-arm J³ by means of the link $j'$. The foot-lever K is provided with a pawl $k$, adapted to engage ratchet-teeth on the quadrant $k'$, which forms a part of the bracket in which the foot-lever K is journaled, so that it may be held in the required positions.

The rocker-arms J² and J³ are secured to the rocker-shaft J in such positions that when the foot-lever is in its forward position (shown in Fig. 4) the gathering-receptacle will be raised and the rocking gate lowered, so that their respective fingers will be in close proximity to each other. This is the position maintained during bunching. When the foot-lever is in its rearward position, (shown in Fig. 3,) the fingers of the gathering-receptacle lie flat on the ground, while the fingers of the rocking gate are raised high.

The operation of the attachment is as follows: When the machine is in operation, the gathering-receptacle is first raised by the foot-lever so as to clear the ground, as shown in Fig. 4, and thus held by means of the pawl $k$ and the ratchet-quadrant $k'$. The cut grass is deposited upon the cutter-bar and the forward portion of the gathering-receptacle. The reel-rake, which is driven about the same rate of speed as the traction-wheels or a little faster, passes immediately over the cutter-bar and rakes the grass back into the back part of the gathering-receptacle, thus keeping the cutter-bar clean. When sufficient grass has been cut to make a bunch, the gathering-receptacle is lowered to the ground and the gate at the same time raised by means of the foot-lever, as shown in Fig. 3, so that the gathered bunch as it is engaged by the stubble which projects through the gatherer-fingers may be permitted to pass freely from the receptacle as the machine advances. When an obstacle is encountered and it is necessary to raise the cutter-bar, it is done by the usual lifting-lever. (Not here shown.) In order that the cutter-bar thus raised may not interfere with the reel, the reel is mounted upon the cutting apparatus, as above described, and hence is raised with the cutter-bar. If the reel-arms of each set revolved in the same plane and were close enough together to completely clear the cutter-bar, they would tend to wind up. To prevent this, they are staggered, as above referred to, so that each arm has a path of revolution of its own and the cutter-bar cleared at as many points as practical. Beaters are adjustably secured to each series of arms to prevent winding. Ordinarily they may be adjusted near the reel-shaft. If, however, the grass is heavy and contains a good many weeds, it will be necessary to adjust them nearer the ends of the arms. This may be determined by experiment.

What I claim as my invention, and desire to secure by Letters Patent, is—

1. In combination with a mowing-machine, a gathering-receptacle pivoted to the cutting apparatus, a gate or closure, manual means for operating the said receptacle and gate simultaneously, a reel-rake comprising a series of arms mounted upon a flexible shaft, said shaft connected at its inner end to the coupling-frame and rigidly secured at its outer end to the finger-bar, and means for automatically operating said reel-rake, substantially as described.

2. In combination with a mowing-machine, supporting-arms mounted thereon, a reel-rake, journaled at one end in said supporting-arms, and mounted at the other end upon the cutting apparatus whereby it conforms to the movement thereof, means for connecting said reel-rake with the traction-wheels, a rocking gate or closure also journaled in said supporting-arms, a gathering-receptacle pivoted to said cutting apparatus, and manual means for operating both said receptacle and gate simultaneously, substantially as described.

3. In combination with a mowing-machine, supporting-arms journaled upon the main axle, a reel-rake, journaled at one end in the front end of said supporting-arms, and mounted at the other upon the cutting apparatus and thereby adapted to conform to the movement thereof, means for connecting said reel-rake with the traction-wheels, a rocking gate or closure provided with a rocker-shaft journaled in the rear end of said supporting-arms, a gathering-receptacle pivoted to the cutting apparatus, a rocker-arm secured to said rocker-shaft and connected to said gathering-receptacle, a foot-lever mounted upon the main frame, a second rocker-arm secured to said rocker-shaft and adapted to be connected with said foot-lever whereby said receptacle and gate may be operated simultaneously, substantially as described.

4. In combination with a mowing-machine, the supporting-arm H journaled upon the main axle, a tie H', a reel-rake having the shaft I journaled in said tie, the post $h$ and the link $h'$ supporting the inner end of said reel-rake, the standard $g^3$ supporting the outer end thereof, the beaters $I^3$ adjustably secured to the arms of said reel-rake, the universal joint $i'$, the tie $H^2$, the rocking gate having the rocker-shaft J journaled in said tie, the shield F', the divider G', the gathering-receptacle pivoted to the cutting apparatus, the rocker-arms $J^2$ and $J^3$ secured to said rocker-shaft, the link $j'$, the link $j$, and the foot-lever K, all combined substantially as described.

In testimony whereof I have signed my name to this specification in the presence of two subscribing witnesses.

JOHN W. LATIMER.

Witnesses:
CHAS. H. CHAMBERS,
A. B. HANSON.